US008138235B2

(12) United States Patent
Yano et al.

(10) Patent No.: US 8,138,235 B2
(45) Date of Patent: Mar. 20, 2012

(54) POLYURETHANE FOAM AND METHOD FOR MANUFACTURING THE SAME

(75) Inventors: Tadashi Yano, Anjo (JP); Satoshi Iwase, Anjo (JP)

(73) Assignee: INOAC Corporation, Nagoya-shi, Aichi (JP)

( * ) Notice: Subject to any disclaimer, the term of this patent is extended or adjusted under 35 U.S.C. 154(b) by 166 days.

(21) Appl. No.: 12/098,262

(22) Filed: Apr. 4, 2008

(65) Prior Publication Data

US 2009/0253822 A1 Oct. 8, 2009

(51) Int. Cl.
*C08G 18/00* (2006.01)
*C08G 18/48* (2006.01)
*C08G 18/16* (2006.01)
*C08J 9/00* (2006.01)

(52) U.S. Cl. ......... 521/174; 521/170; 521/106; 521/120

(58) Field of Classification Search ................. 521/170, 521/174, 106, 120
See application file for complete search history.

(56) References Cited

U.S. PATENT DOCUMENTS 4,968,724 A * 11/1990 Mascioli ...................... 521/103
5,397,811 A * 3/1995 Lunardon et al. ............ 521/159
6,136,879 A * 10/2000 Nishida et al. ................ 521/174
6,583,192 B2 * 6/2003 Falke et al. .................. 521/130
2008/0132594 A1 * 6/2008 Iwase ............................ 521/98

FOREIGN PATENT DOCUMENTS

JP 03-109414 5/1991
JP 06-041266 2/1994
JP 06-199973 7/1994
JP 2003-221425 8/2003

* cited by examiner

*Primary Examiner* — Mark Eashoo
*Assistant Examiner* — Angela C Scott
(74) *Attorney, Agent, or Firm* — Marsh Fischmann & Breyfogle LLP

(57) ABSTRACT

A polyurethane foam is obtained by reacting, foaming, and curing raw material that includes a polyol, a polyisocyanate, a blowing agent, a catalyst, and an inorganic compound hydrate. The raw material includes, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000. The blending quantity of the inorganic compound hydrate is 10 to 80 parts by mass per 100 parts by mass of the polyol. Preferably, the raw material further includes, as the polyol, a polyether polyol obtained by addition polymerization of an alkylene oxide to a polyhydric alcohol and has a molecular weight of 2,000 to 4,000.

21 Claims, No Drawings

POLYURETHANE FOAM AND METHOD FOR MANUFACTURING THE SAME

BACKGROUND OF THE INVENTION

The present invention relates to a light-weight, high-hardness and good-moldability polyurethane foam which can be used for, for example, sun visors or hood silencers, which are motor vehicle parts, and to a method for manufacturing the same.

In order to improve the fuel consumption or the like, the weight of a car is desired to be reduced. Polyurethane foam used for vehicle parts such as sun visors a hood silencer is also expected to have a lower density while maintaining the physical properties. Hood silencers, which is motor vehicle parts, or the like are formed from a cover material and a polyurethane foam to have a desired three-dimensional shape by hot press molding, in which the cover material and the polyurethane foam are laminated and bonded together in a mold. Conventionally, it has been difficult to reduce the apparent density of polyurethane foam to 30 kg/m$^3$ or less. Specifically, in order to manufacture polyurethane foam having an open cell structure, a predetermined hardness, and a low density, it is necessary to increase the content of water as a blowing agent in a raw material of the polyurethane foam. In this case, the increase in the content of water causes an increase in the exothermic temperature of the raw material to 170° C. or higher. As a result, there is a possibility of self-ignition based on oxidation deterioration (scorching) of polyurethane, and the resulting polyurethane foam is discolored according to the scorching. In order to avoid such a situation, it is known that a blowing auxiliary is added to the raw material with the conventional content of water. As a blowing auxiliary, methylene chloride and liquefied carbon dioxide may be used.

However, methylene chloride is one of the substances that have an adverse influence on environment, and its use is regulated. On the other hand, foaming with liquefied carbon dioxide requires equipment exclusive for supplying liquefied carbon dioxide at a high pressure, and in order to perform foaming smoothly, not only manufacturing conditions are limited but also manufacturing costs are increased. Japanese Laid-Open Patent Publication No. 6-199973 discloses a technique where a polyolefin powder, such as polyethylene powder, is added to a polyurethane foam raw material for the purpose of causing endothermic reaction. Japanese Laid-Open Patent Publication No. 6-41266 discloses another technique where a styrene-containing polymeric polyol and an amino alcohol are used as polyol, which is a raw material for a polyurethane foam. The polyurethane foam obtained by this technique can be laminated with a cover material by hot press molding at a low temperature and then formed into a desired shape by vacuum forming.

However, for the technique described in Japanese Laid-Open Patent Publication No. 6-199973, though the effect is observed of lowering the exothermic temperature during the reaction and foaming of the raw material, the blending quantity of the polyolefin powder needs to be increased so as to effectively suppress the amount of the exothermic heat. In that case, the density of the resultant flexible polyurethane foam becomes excessively high and the physical properties such as residual compression strain deteriorate due to the increased amount of polyolefin powder. To prevent the deterioration of such physical properties, the blending quantity of the polyolefin powder needs to be reduced. Thus, the technique described in Japanese Laid-Open Patent Publication No. 6-199973 cannot effectively lower the exothermic temperature during the reaction and foaming of the raw material, leading to the problem of being unable to suppress the discoloration due to scorching.

The technique described in Japanese Laid-Open Patent Publication No. 6-41266 simply uses a polymeric polyol and an amino alcohol together as polyols. Japanese Laid-Open Patent Publication No. 6-41266 states that the hot-press moldability of the resultant polyurethane foam is good at low temperatures. However, the density of the polyurethane foams of Examples 1 and 2 described in the patent document was as high as 51 to 52 kg/m$^3$. The technique described in Japanese Laid-Open Patent Publication No. 6-41266 poses the problem of being unable to inhibit the discoloration of the polyurethane foam because the exothermic temperature increases when trying to lower the density of the polyurethane foam.

SUMMARY OF THE INVENTION

An objective of the present invention is to provide a low-density, high-hardness, and good-moldability polyurethane foam whose discoloration is suppressed.

In order to achieve the foregoing objective and in accordance with one aspect of the present invention, a polyurethane foam obtained by reacting, foaming, and curing a raw material which comprises a polyol, a polyisocyanate, a blowing agent, a catalyst, and an inorganic compound hydrate is provided. The raw material contains, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000. The blending quantity of the inorganic compound hydrate is 10 to 80 parts by mass per 100 parts by mass of the polyol.

In accordance with another aspect of the present invention, a method for manufacturing a polyurethane foam is provided. The method includes: preparing polyurethane foam raw material that contains a polyol, a polyisocyanate, a blowing agent, a catalyst, and an inorganic compound hydrate; and producing the polyurethane foam by reacting, foaming, and curing the raw material. The raw material contains, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000. The blending quantity of the inorganic compound hydrate is 10 to 80 parts by mass per 100 parts by mass of polyol.

DETAILED DESCRIPTION OF THE PREFERRED EMBODIMENTS

The best mode for carrying out the present invention will be described below. The polyurethane foam of this embodiment is obtained by reacting, foaming and curing polyurethane foam raw material that includes a polyol, a polyisocyanate, a blowing agent, a catalyst, and an inorganic compound hydrate. The raw material includes, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000. The raw material also includes an inorganic compound hydrate in an amount of 10 to 80 parts by mass per 100 parts by mass of the polyol. In the following description, "mass average molecular weight" will be referred to simply as "molecular weight", the above polyether polyol having a mass average molecular weight of 400 to 1,000 will be referred to as "low molecular weight polyether polyol", and "polyurethane foam" will be referred to simply as "foam".

The grafted portion of the polymeric polyol strengthens this foam. And the low molecular weight polyether polyol increases the crosslink density of the foam, enlarges a hard segment, and improves the hardness and moldability (moldability at high temperatures) of the foam. Furthermore, since the raw material of the foam includes the inorganic compound hydrate in an amount of 10 to 80 parts by mass per 100 parts by mass of the polyols, the latent heat of vaporization of the water formed by the dissociation of the hydrate decreases the exothermic temperature of the foam raw material, the increase in the amount of water as a blowing agent decreases the density of the foam, and the discoloration of the foam is suppressed.

The polyurethane obtained by urethane-foaming reaction of polyol and polyisocyanate is mainly composed of a hard segment based on a urethane linkage and a soft segment based on, for example, a polyether linkage. The hard segment develops specific physical properties, for example, hardness and rigidity, and the soft segment develops other physical properties, for example, flexibility and elasticity.

The raw material of the foam will be described. The raw material includes a polyol, specifically the raw material includes the above described polymeric polyol and the above described low molecular weight polyether polyol as essential ingredients. The polyether polyol for forming the above polymeric polyol is obtained by addition polymerization of an alkylene oxide to a polyhydric alcohol. Examples of the polyhydric alcohols used include glycerin, dipropylene glycol and trimethylolpropane. Examples of the alkylene oxides used include ethylene oxide and propylene oxide. Examples of the vinyl monomers used include acrylonitrile, styrene and methyl methacrylate.

The polymeric polyol is obtained by graft polymerization of a vinyl monomer to the above polyether polyol in accordance with a conventional method. The content of the vinyl monomer in the polymeric polyol, that is, the content of the vinyl monomer unit (grafted portion) in the polymeric polyol is preferably 10 to 40% by mass, more preferably 15 to 30% by mass, based on the total amount of polyether polyol units and vinyl monomer units. When the content of the vinyl monomer is less than 10% by mass, there is a possibility that the grafted portion in the polymeric polyol may be insufficient, and the functional expression of this grafted portion may become insufficient. When the content of the vinyl monomer exceeds 40% by mass, there is a possibility that the grafted portion may become excessive and the foam may become excessively hard. In the polymeric polyol, the grafted portion is solid due to crystallization.

The molecular weight of the polymeric polyol is preferably from 3,000 to 6,000. When the molecular weight of the polymeric polyol is less than 3,000, the effect of the grafted portion is not sufficiently developed, and it becomes difficult to increase the physical properties, for example, hardness of the foam. When the molecular weight of the polymeric polyol exceeds 6,000, the hardness of the foam tends to become excessively high.

The low molecular weight polyether polyol is obtained by the same manufacturing method using the same raw material as the above polyether polyol. The low molecular weight polyether polyol includes, for example, a triol in which glycerin is addition-polymerized with propylene oxide, a triol in which the triol is further addition-polymerized with ethylene oxide, a diol in which dipropylene glycol is addition-polymerized with propylene oxide, polypropylene glycol, and polytetramethylene glycol. The amount of ethylene oxide addition-polymerized is about 5 to 15% by mol. A higher content of the ethylene oxide unit enhances hydrophilicity of the low molecular weight polyether polyol to improve the mixability with highly polar molecules, for example, polyisocyanate, to thereby enhance reactivity.

The polyether polyol may be polyether-ester polyol. The polyether-ester polyol is obtained by allowing a polyoxyalkylene polyol to react with a polycarboxylic anhydride and a compound having a cyclic ether group. The polyoxyalkylene polyol includes, for example, polyethylene glycol, polypropylene glycol, and a propylene oxide adduct of glycerin. The polycarboxylic anhydride includes, for example, succinic anhydride, adipic anhydride, and phthalic anhydride. The compound having a cyclic ether group includes, for example, ethylene oxide and propylene oxide.

The above low molecular weight polyether polyol is preferable, because it is superior to a polyester polyol in terms of reactivity with polyisocyanate and it is not hydrolyzed. When the molecular weight of the low molecular weight polyether polyol is less than 400, the foam will have an excessively high crosslinking density and an increased hard-segment content, and thereby the foam will have excessively high hardness. When the molecular weight of the low molecular weight polyether polyol exceeds 1,000, the effect of the low molecular weight polyether polyol will not sufficiently demonstrated, the foam tends to become soft.

The content of the polymeric polyol based on the total amount of the above low molecular weight polyether polyol and the polymeric polyol is preferably 40 to 75% by mass. Therefore, the content of the low molecular weight polyether polyol based on the total amount of the low molecular weight polyether polyol and the polymeric polyol is preferably 25 to 60% by mass. When the content of the polymeric polyol is less than 40% by mass, and when the content of the low molecular weight polyether polyol exceeds 60% by mass, the crosslinking density of the foam will be excessively high and an open cell structure will not be sufficiently formed, and there is a possibility that the function of the polymeric polyol may not be sufficiently exhibited. When the content of the polymeric polyol exceeds 75% by mass, and when the content of the low molecular weight polyether polyol is less than 25% by mass, the crosslinking density of the foam will be too low, and the hardness of this foam tends to be reduced.

Preferably, the above raw material includes, as the polyol, a polyether polyol obtained by addition polymerization of an alkylene oxide to a polyhydric alcohol and having a molecular weight of 2,000 to 4,000 in order to improve the flexibility of the foam. In the following description, the polyether polyol having a molecular weight of 2,000 to 4,000 will be referred to as "high molecular weight polyether polyol". Reaction of the high molecular weight polyether polyol with the polyisocyanate increases the rate of the soft segment of the foam. When the molecular weight of the high molecular weight polyether polyol is less than 2,000, the crosslinking density of the foam will be increased, and there is a possibility that the effect of blending the high molecular weight polyether polyol may be reduced. When the molecular weight of the high molecular weight polyether polyol exceeds 4,000, there is a possibility that the flexibility of the foam may be increased.

The content of the high molecular weight polyether polyol based on the total amount of the above polymeric polyol, low molecular weight polyether polyol, and high molecular weight polyether polyol is preferably 50% by mass or less. When the content of the high molecular weight polyether polyol exceeds 50% by mass, the flexibility of the foam will be excessively high, and it will be difficult to obtain a target foam.

The above raw material may include, as the polyol, a polyester polyol besides the above polymeric polyol and polyether polyol. The polyester polyol includes, for example, condensed polyester polyol obtained by reacting polycarboxylic acid with polyol, lactone polyester polyol, and polycarbonate polyol. The polycarboxylic acid for forming the condensed polyester polyol includes, for example, adipic acid and phthalic acid. The polyol for forming the condensed polyester polyol includes, for example, ethylene glycol, propylene glycol, and glycerol. The number of hydroxyl functional groups and the hydroxyl number of the polyol can be changed by controlling the kind, molecular weight, polymerization degree, condensation degree, etc. of the raw material for the polyol.

In order to increase the crosslinking density of the foam to thereby improve physical properties, for example, the hardness thereof, the foam raw material preferably comprises a crosslinking agent having three hydroxyl groups per molecule. The crosslinking agent reacts with the polyisocyanate to form a crosslinking structure in the foam. The crosslinking agent includes, for example, glycerin and trimethylolpropane.

The polyisocyanate that reacts with the polyol is a compound having a plurality of isocyanate groups. The polyisocyanate includes, for example, tolylene diisocyanate (TDI), 4,4-diphenylmethane diisocyanate (MDI), polymeric MDI, 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), and modified products thereof. Of these specific examples of polyisocyanates, tolylene diisocyanate is preferably used to suppress the shrinkage during heating (heat shrinkage). Examples of the tolylene diisocyanate having such an action include 2,4-tolylene diisocyanate, 2,6-tolylene diisocyanate, and the mixture thereof. Tolylene diisocyanate has a good dispersibility, compared with polymeric MDI, and it probably exists uniformly in the foam, thereby making the crosslinking uniform.

An isocyanate index of the polyisocyanate may be 100 or less or may exceed 100, but it is preferably from 80 to 100. When the isocyanate index is less than 80, the content of the polyisocyanate is too small to obtain a foam having favorable mechanical properties, for example, favorable hardness. When the isocyanate index exceeds 100, the exothermic temperature at the time of foaming will increase, and there is a possibility that the flexibility of the foam may be reduced. The isocyanate index is an equivalent ratio of an isocyanate group of the polyisocyanate to the total of a hydroxyl group of polyol, a hydroxyl group of the crosslinking agent, and an active hydrogen group of the blowing agent such as water, expressed by percentage. The isocyanate index of more than 100 means that the polyisocyanate is excessive in comparison with the polyol and the like.

The blowing agent causes foaming of a polyurethane resin to thereby form the foam. The blowing agent includes, for example, water, pentane, cyclopentane, hexane, cyclohexane, dichloromethane, methylene chloride, and carbon dioxide gas. Water is preferred as a blowing agent because water has high reactivity in the foam-forming reaction and is easy in handling. When the blowing agent is water, the content of water in the raw material is preferably from 5 to 15 parts by mass based on 100 parts by mass of the polyol, in order to obtain an apparent density of the foam as low as 14 to 20 $kg/m^3$. When the content of water is less than 5 parts by mass, the amount of foaming is small and there is a tendency that the apparent density of the foam exceeds 20 $kg/m^3$. Therefore, it is difficult to reduce the density of the foam. When the content of water exceeds 15 parts by mass, the temperature of the raw material will rise easily at the time of reaction and foaming, and it will become difficult to reduce this temperature.

The catalyst accelerates mainly the urethane forming reaction between the polyol and the polyisocyanate. The catalyst includes, for example, a tertiary amine, an organometallic compound, an acetate, and an alkali metal alcoholate. The tertiary amine includes, for example, triethylenediamine, dimethylethanolamine and N,N',N'-trimethyl aminoethyl piperazine. The organometallic compound includes, for example, tin octylate (tin octoate).

The above-described inorganic compound hydrate decomposes upon heating and generates water by the decomposition. The inorganic compound hydrate includes, for example, calcium sulfate dihydrate [$CaSO_4.2H_2O$, alias: gypsum dihydrate, specific gravity 2.32, decomposition temperature 128 to 163° C. (from $-1.5H_2O$ to $-2.0H_2O$)], magnesium sulfate heptahydrate [$MgSO_4.7H_2O$, specific gravity 1.68, decomposition temperature 150° C. ($-6H_2O$)], magnesium phosphate octahydrate [$(Mg)_3(PO_4)_2.8H_2O$, specific gravity 2.41, decomposition temperature 120° C. ($-5H_2O$)], iron sulfate monohydrate to iron sulfate pentahydrate (from $FeSO_4.H_2O$ to $FeSO_4.5H_2O$, specific gravity 2.97, decomposition temperature 100 to 130° C.), and mixtures thereof.

The water of hydration contained in the inorganic compound hydrate is water of crystallization, and is present stably as a solid crystal at the ordinary temperature (25° C.). The inorganic compound hydrate preferably includes a calcium sulfate hydrate, a magnesium sulfate hydrate, and a magnesium phosphate hydrate. This is because these hydrates can gradually dissociate (decompose) at 100° C. or above along the foaming process of the foam raw material to produce water, thus capable of developing the endothermic action based on the latent heat of vaporization.

The specific gravity of the inorganic compound hydrate is preferably from 1.5 to 3.0. When the specific gravity of the inorganic compound hydrate is less than 1.5, it is necessary to add a large volume of the inorganic compound hydrate, which is powder, to the foam raw material, for example, the polyol in order to add a predetermined mass of the inorganic compound hydrate. Therefore, there is a possibility that the inorganic compound hydrate, which is a powder, and polyol cannot sufficiently be mixed and stirred. There is also a possibility that the volume of the inorganic compound hydrate occupied in the foam may be increased to thereby reduce the physical properties of the foam. When the specific gravity of the inorganic compound hydrate exceeds 3.0, the inorganic compound hydrate will sediment easily in the foam raw material, particularly in the polyol during prolonged storage thereof, and the dispersibility into the reaction mixture will be reduced. As a result, there is a possibility that the function of the inorganic compound hydrate to reduce the exothermic temperature of the reaction mixture at the time of the reaction of the raw material may be reduced.

The decomposition temperature of the inorganic compound hydrate is preferably from 100 to 170° C. When the decomposition temperature is less than 100° C., water due to the decomposition is produced in the early stage of the foaming and curing of the foam raw material, that is, in the stage where exothermic temperature is low. Therefore, there is a possibility that it may have an adverse influence on the foaming and curing of the raw material, or the produced water may function as a blowing agent. Calcium sulfate dihydrate (gypsum dihydrate) loses water at 128° C. to form calcium sulfate hemihydrate (gypsum hemihydrate), wherein 1.5 mol of water in 2 mol of water in the molecule decompose to form free water. Magnesium sulfate heptahydrate loses water at 150° C. to form magnesium sulfate monohydrate, wherein 6 mol of water in 7 mol of water in the molecule decompose to form free water.

The content of the inorganic compound hydrate in the raw material is preferably from 10 to 80 parts by mass per 100 parts by mass of the polyol. When the content of the inorganic compound hydrate is less than 10 parts by mass, the amount of the water produced by the decomposition is small, and the increase of the exothermic temperature of the reaction mixture based on the reaction and foaming of the raw material cannot sufficiently be suppressed. When the content of the inorganic compound hydrate exceeds 80 parts by mass, there is a possibility of causing reduction in physical properties, for example, hardness and moldability of the foam.

The foam raw material preferably contains a foam stabilizer in order to perform the foaming smoothly. As the foam stabilizer of this invention, a generally used foam stabilizer for producing a foam is available. Specific examples of the foam stabilizer include, for example, a silicone compound, an anionic surfactant, polyether siloxane, and a phenolic compound. The anionic surfactant includes, for example, sodium dodecylbenzenesulfonate and sodium lauryl sulfate. The content of the foam stabilizer in the raw material is preferably from 0.5 to 2.5 parts by mass per 100 parts by mass of the polyol. When the content of the foam stabilizer is less than 0.5 part by mass, the foam-stabilizing effect at the time of foaming of the foam raw material is not sufficiently developed, but it becomes difficult to obtain a favorable foam. When the content of the foam stabilizer exceeds 2.5 parts by mass, the form-stabilizing effect becomes strong, and the free passage properties of cells tend to be reduced.

In the case where the foam is used for, for example, sun visors or hood silencers, which are motor vehicle parts, preferably the raw material includes a flame-retardant. A flame-retardant imparts flame retardant properties (low flammability) to the foam. Examples of the flame-retardants include known phosphorous flame-retardants, halogen flame-retardants and inorganic flame-retardants. These flame-retardants are blended in the raw material through conventional process. Specific examples of the flame-retardants include phosphorous flame-retardants and halogen flame-retardants. Phosphorous flame-retardants include, for example, oxydi-2,1-ethanediyl tetrakis(2-chloro-1-methylethyl)phosphate (halogen-containing flame-retardant) and phosphoric ester (non-halogen-containing flame-retardant). Halogen flame-retardants include, for example, tetrabromobisphenol A. The blending quantity of the flame-retardant is established depending on the purpose for which the foam is used; however, the amount is about 10 to 30 parts by mass per 100 parts by mass of polyol. The raw material may include a filler, a stabilizer, a colorant, a plasticizer, etc., besides the above ingredients, depending on the situation.

The foam is produced by reaction, foaming, and curing of the raw material. Although the reaction for producing the foam is complicated, typically, production of the foam mainly involves the following reactions. Specifically, they are an addition-polymerization reaction (urethane-forming reaction, resinification reaction) of the polyol with the polyisocyanate, a foam-forming (foaming) reaction of the polyisocyanate with the blowing agent, for example, water, and a crosslinking (curing) reaction of the resulting products of these reactions with the polyisocyanate. In the production of the foam, a one-shot process or a prepolymer technique is adopted. The one-shot process is a process for directly reacting the polyol with the polyisocyanate. The prepolymer technique is a technique, for example, of reacting the total amount of one of the polyol and the polyisocyanate with a part of the other beforehand to obtain a prepolymer having as isocyanate group in a terminal, and then reacting the product with the rest or the other. Moreover, the foam may be a slab foam obtained by foaming and curing the raw material under ordinary temperature and atmospheric pressure, or a mold foam obtained by pouring a foam raw material (reaction mixture) into a mold followed by mold clamping, and then foaming and curing the raw material within the mold. Specifically, a flexible slab foam is produced continuously by delivering the raw material (reaction mixture) onto a belt conveyor at ordinary temperature and atmospheric pressure, whereas a molded foam (molded product) is produced batch-wise by delivering the reaction mixture into a mold. The slab foam is preferred because it can be produced continuously.

The foam thus obtained has an apparent density based on JIS K 7222: 1999 which is Japanese Industrial Standards (ISO 845 which is international standards) of 14 to 20 kg/m$^3$. Moreover, the foam has a hardness based on JIS K 6400-2: 2004 (ISO 2439) of 15 to 25 kPa. Thus, the foam is a flexible polyurethane foam having a low density, favorable cushioning properties, a light weight and a good sound absorption quality. The flexible polyurethane foam is a foam that generally has an open cell (air bubble) structure, has elasticity, and has recovery properties. In addition, the foam has favorable moldability and can also suppress discoloration (yellow index, ΔYI value) to 1.5 or less. Therefore, the foam is suitably used for vehicle parts, for example, sun visors a hood silencer.

In this embodiment, in manufacturing a foam, the above described polymeric polyol and low molecular weight polyether polyol are used together as the polyol. The polymeric polyol reacts with polyisocyanate to form a soft segment. The crystallinity of the grafted portion, which extends like branches, is high and the grafted portion strengthens the foam. The polyether polyol having a molecular weight as low as 400 to 1000 reacts with polyisocyanate not only to form a soft segment, but also to enlarge a hard segment. Thus, the crosslink density of the foam is increased and the rigidity of the same is enhanced.

Besides, the raw material of the foam includes the inorganic compound hydrate in an amount of 10 to 80 parts by mass per 100 parts by mass of polyol. Thus, with the temperature increase during the reaction and foaming of the raw material, the inorganic compound hydrate is dissociated to form water. And with the vaporization of the water, the evaporation latent heat is removed, whereby the exothermic temperature of the foam raw material is lowered. The amount of the water, as the blowing agent, is thus increased, and the density of the foam is decreased while inhibiting the discoloration of the same.

In the case that tolylene diisocyanate is used as the polyisocyanate, the crosslinking during the urethane forming reaction probably progresses uniformly throughout the foam, since tolylene diisocyanate has a good dispersibility compared with polymeric MDI. Thus, the resultant foam is dense, and the shrinkage of the foam is kept minimal when the foam is heated.

The foam of the above embodiment offers the following advantages.

In the foam of the embodiment, the above described polymeric polyol and low molecular weight polyether polyol are used together as the polyol. The polymeric polyol reacts with the polyisocyanate, and the grafted portion shows the action of strengthening the polyurethane foam. The above described low molecular weight polyether polyol reacts with the polyisocyanate not only to increase the crosslink density of the foam, but also to enlarge a hard segment. Thus, the hardness and moldability such as hot press moldability of the foam is enhanced.

Besides, the raw material of the foam includes the inorganic compound hydrate in an amount of 10 to 80 parts by mass per 100 parts by mass of the polyol. The inorganic compound hydrate is dissociated to form water during the reaction and foaming of the raw material. And with the vaporization of the water, the latent heat is removed, whereby the exothermic temperature of the foam raw material is lowered. Thus, the amount of the water, as the blowing agent, is increased, and the density of the foam is decreased while suppressing the discoloration of the same.

If the raw material further includes the above described high molecular weight polyether polyol as the polyol, the polyether polyol reacts with polyisocyanate, thereby enlarging a proportion of a soft segment. Thus, the flexibility of the foam is improved.

If the raw material further includes the above described crosslinking agent, the crosslink density of the foam is increased, whereby the physical properties such as hardness is improved.

If the above described polyisocyanate is tolylene diisocyanate, the heat shrinkage of the foam is suppressed, and the foam is suitably used in the application of motor vehicle parts such as hood silencer which is exposed to heat released from the engine.

If a hydrate of a sulfate or phosphate is used as the inorganic compound hydrate, the hydrate of a sulfate or phosphate is dissociated with the foaming process of the raw material to form water, and a good endothermic action is achieved.

If water is used as the above described blowing agent and the blending quantity of water is 5 to 15 parts by mass per 100 parts by mass of the polyol, a foaming reaction progresses sufficiently.

If the raw material further includes a flame-retardant, flame retardant properties is imparted to the resultant foam.

If the above described foam is a flexible polyurethane foam, the functions of the foam are effectively exhibited.

If the above described foam is obtained from a slab foam, the foam is manufactured easily and continuously.

The method for manufacturing the above described foam includes: a step of preparing the above described raw material; and a step of producing a polyurethane foam by reacting, foaming and curing the raw material. By this method, the raw material is easily prepared and the foam is easily obtained.

It should be apparent to those skilled in the art that the present invention may be embodied in many other specific forms without departing from the spirit or scope of the invention. Particularly, it should be understood that the invention may be embodied in the following forms.

Of the specific examples of the ingredients, either one type alone or two or more types together may be used. For example, more than one type of hydrate, for example, calcium sulfate hydrate and magnesium sulfate hydrate may be used together as inorganic compound hydrates. In such a case, the function of the inorganic compound hydrates is exhibited in a wider temperature range and the exothermic temperature during the reaction and foaming is effectively lowered, compared with the case where only one type of hydrate is used.

For example, iron sulfate nonahydrate [$FeSO_4.9H_2O$, specific gravity: 2.12, decomposition temperature: 98 to 125° C. (from $-5H_2O$ to $-8H_2O$)] and copper sulfate pentahydrate [$CuSO_4.5H_2O$, specific gravity: 2.29, decomposition temperature: 110° C. ($-4H_2O$)] may be used as inorganic compound hydrates.

The above described raw material may also include a polyether polyol having a molecular weight of 1,000 to 2,000 as the polyether polyol.

The above described raw material may also include a mixture of 80% by mass of 2,4-tolylene diisocyanate and 20% by mass of 2,6-tolylene diisocyanate as the polyisocyanate.

In the following the embodiment will be described in further detail by several Examples and Comparative Examples. It should be understood that the present invention is not intended to be limited to these Examples.

EXAMPLES 1-14 AND COMPARATIVE EXAMPLES 1-6

The raw material of a foam was prepared from the ingredients shown in Table 1 and Table 2. The meaning of the abbreviations in the following tables will be shown below. In the following tables, the values in columns for the ingredients of the raw material are shown in terms of parts by mass. In Comparative Example 1, gypsum dihydrate, as an inorganic compound hydrate, was not blended. In Comparative Example 2, the blending quantity of the gypsum dihydrate was excessively small. In Comparative Example 3, no polymeric polyol was blended. In Comparative Examples 4 and 5, the above low molecular weight polyether polyol was not blended. In Comparative Example 6, neither the above low molecular weight polyether polyol nor gypsum was blended, and the blending quantity of water, as a blowing agent, was small compared with that of each of Examples and Comparative Examples 1 to 5.

The raw material ingredients were poured into a foaming container of 500 mm×500 mm×500 mm, foamed at ordinary temperature (25° C.) and atmospheric pressure (0.1 MPa), and cured (crosslinked) by passing through a heating furnace to obtain respective flexible slab foams. Each of the obtained flexible slab foams was cut into sheets of foam. Each foam was measured for its apparent density, hardness, moldability, maximum exothermic heat, susceptibility to discoloration (ΔYI value) and heat shrinkage (%) according to the measuring methods described below. The results are shown in Table 1 and Table 2.

Excenol 941: polymeric polyol manufactured by ASAHI GLASS CO., LTD. in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has a molecular weight of 5,000, a solid content of 40% by mass, a hydroxyl value of 33 mgKOH/g, and a number of hydroxyl groups per molecule of three;

Excenol 941: polymeric polyol manufactured by ASAHI GLASS CO., LTD. in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has a molecular weight of 5,000, a solid content of 40% by mass, a hydroxyl value of 33 mgKOH/g, and a number of hydroxyl groups per molecule of three;

POP 31/28: polymeric polyol manufactured by MITSUI CHEMICALS POLYURETHANES, INC. in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has a molecular weight of 6,000, a solid content of 20% by mass, a hydroxyl value of 28 mgKOH/g, and a number of hydroxyl groups per molecule of three;

POP 31/28: polymeric polyol manufactured by MITSUI CHEMICALS POLYURETHANES INC. in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has a molecular weight of 6,000, a solid content of 20% by mass, a hydroxyl value of 28 mgKOH/g, and a number of hydroxyl groups per molecule of three;

G 700: polyether polyol manufactured by ADEKA CORPORATION in which glycerin is addition-polymerized with propylene oxide, and which has a molecular weight of 700, a hydroxyl value of 240 mgKOH/g, and a number of hydroxyl groups per molecule of three;

G 700: polyether polyol manufactured by ADEKA CORPORATION in which glycerin is addition-polymerized with propylene oxide, and which has a molecular weight of 700, a hydroxyl value of 240 mgKOH/g, and a number of hydroxyl groups per molecule of three;

G 400: polyether polyol manufactured by ADEKA CORPORATION in which glycerin is addition-polymerized with propylene oxide, and which has a molecular weight of 400, a hydroxyl value of 420 mgKOH/g, and a number of hydroxyl groups per molecule of three;

G 400: polyether polyol manufactured by ADEKA CORPORATION in which glycerin is addition-polymerized with propylene oxide, and which has a molecular weight of 400, a hydroxyl value of 420 mgKOH/g, and a number of hydroxyl groups per molecule of three;

GP 3000: polyether polyol manufactured by SANYO CHEMICAL INDUSTRIES, LTD. in which glycerin is addition-polymerized with propylene oxide, and which has a molecular weight of 3,000, a hydroxyl value of 56 mgKOH/g, and a number of hydroxyl groups per molecule of three;

GP 3000: polyether polyol manufactured by Sanyo Chemical Industries Ltd. in which glycerin is addition-polymerized with propylene oxide, and which has a molecular weight of 3,000, a hydroxyl value of 56 mgKOH/g, and a number of hydroxyl groups per molecule of three;

Gypsum dihydrate: gypsum dihydrate having a specific gravity of 2.32 and an average particle diameter of 40 μm;

Magnesium sulfate heptahydrate: magnesium sulfate heptahydrate having a specific gravity of 1.68 and an average particle diameter of 20 μm;

Magnesium phosphate octahydrate: magnesium phosphate octahydrate having a specific gravity of 1.68 and an average particle diameter of 40 μm;

Dimethylethanolamine: catalyst

Organometallic compound MRH-110: tin octylate manufactured by Johoku Chemical Co., Ltd.;

Foam stabilizer F650: a silicone foam stabilizer manufactured by Shin-Etsu Chemical Co., Ltd.;

Flame retardant CR 504: oxydi-2,1-ethanediyl tetrakis (2-chloro-1-methylethyl) phosphate manufactured by Daihachi Chemical Industry Co., Ltd.;

Polymeric MDI: M-12S, manufactured by BASF INOAC Polyurethanes Ltd., the content of an isocyanate group is 31%;

Polyisocyanate T-65: tolylene diisocyanate manufactured by NIPPON POLYURETHANE INDUSTRY CO., LTD., the mixture of 65% by mass 2,4-tolylene diisocyanate and 35% by mass 2,6-tolylene diisocyanate; and TMP: trimethylolpropane.

(Measuring Method)

Apparent density (kg/m$^3$): A foam in each of Examples and Comparative examples was measured for the apparent density according to JIS K 7222: 1999 (ISO 845). In Table 1 to Table 4, "apparent density" is referred to simply as "density".

Hardness (kPa): A sample of 150 mm long, 100 mm wide, and 50 mm high, which was made from a foam in each of Examples and Comparative examples, was measured for the compressive stress when compressed by 25% according to JIS K 6400-2: 2004 (ISO 2439).

Moldability: A foam in each Example and Comparative example having a thickness of 15.0 mm was set in a hot press machine, which was preset at a temperature of the hot platen of 200° C., and compressed to 7.50 mm in thickness (a compressibility of 50%) in a press time of 30 minutes, and the moldability of the foam was determined visually.

Maximum temperature (° C.): A thermocouple was inserted into the central part of a foaming container, and the raw material in each of Examples and Comparative examples was measured for the maximum temperature during the reaction and foaming of the raw material.

Discoloration (ΔYI value): A part (central part) of a foam that showed a high temperature and a part (side surface part) of the foam that showed a low temperature, during the reaction and foaming of the raw material in each of Examples and Comparative Examples, were measured for the yellowing degree (whiteness degree) with a color-difference meter [SM color computer SM-4 made by Suga Test Instruments Co., Ltd.], and discoloration was shown by the color difference (ΔYI value) of these values.

Heat shrinkage (%): The foam of each of Examples and Comparative Examples was heated at 150° C. for 500 hours, and volume shrinkage (%) was computed by dividing the decrease in volume of the foam after heating by the volume of the foam before heating.

TABLE 1

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Excenol 941 | 50 | 30 | 50 | 50 | 50 | — | 50 | 50 | 50 | 50 | 50 | 50 | 50 | 50 |
| POP31/28 | — | — | — | — | — | 50 | — | — | — | — | — | — | — | — |
| G-700 | 20 | 40 | 20 | 20 | 20 | 20 | 20 | 20 | 40 | 20 | 20 | 20 | — | 50 |
| G-400 | — | — | — | — | — | — | — | — | — | — | — | — | 20 | — |
| GP3000 | 30 | 30 | 30 | 30 | 30 | 30 | 30 | 30 | 30 | 30 | 30 | 30 | 30 | — |
| Glycerin | 5 | 5 | 5 | 5 | 5 | 5 | 5 | 5 | 5 | 5 | — | 5 | 5 | 5 |
| Gypsum dihydrate | 30 | 30 | 30 | 30 | 30 | 30 | — | — | 10 | 50 | 30 | 30 | 30 | 30 |
| Magnesium sulfate heptahydrate | — | — | — | — | — | — | 30 | — | — | — | — | — | — | — |

TABLE 1-continued

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Magnesium phosphate octahydrate | — | — | — | — | — | — | — | 30 | — | — | — | — | — | — |
| Water | 8 | 8 | 8 | 8 | 12 | 8 | 8 | 8 | 8 | 8 | 8 | 8 | 8 | 8 |
| Dimethyl-ethanolamine | 0.3 | 0.3 | 0.3 | 1.0 | 0.3 | 0.3 | 0.3 | 0.3 | 0.3 | 0.3 | 0.3 | 0.3 | 0.3 | 0.3 |
| Organometallic compound MRH-110 | 0.3 | 0.3 | 0.3 | — | 0.3 | 0.3 | 0.3 | 0.3 | 0.3 | 0.3 | 0.3 | 0.3 | 0.3 | 0.3 |
| Foam stabilizer F-650 | 1 | 1 | 1 | 1 | 1 | 1 | 1 | 1 | 1 | 1 | 1 | 1 | 1 | 1 |
| Flame-retardant CR504 | 10 | 10 | 10 | 10 | 10 | 10 | 10 | 10 | 10 | 10 | 10 | 10 | 10 | 10 |
| Polymeric MDI | — | — | — | 145.9 | — | — | — | — | — | — | — | — | — | — |
| Polyisocyanate T-65 | 93.7 | 99.5 | 83.3 | — | 114.2 | 94.0 | 94.4 | 94.4 | 94.4 | 94.4 | 81.6 | 104.9 | 99.4 | 102.1 |
| Isocyanate index | 90 | 90 | 80 | 90 | 80 | 90 | 90 | 90 | 90 | 90 | 90 | 100 | 90 | 90 |
| Density (kg/m$^3$) | 18.0 | 17.3 | 18.5 | 17.5 | 14.1 | 17.2 | 17.6 | 18.2 | 16.8 | 19.8 | 18.7 | 18.3 | 18.7 | 17.1 |
| Hardness (kPa) | 19.6 | 21.3 | 18.3 | 23.1 | 19.3 | 17.1 | 19.4 | 20.1 | 21.1 | 18.3 | 16.9 | 23.5 | 20.1 | 22.1 |
| Moldability | 7.51 | 7.52 | 7.49 | 7.49 | 7.49 | 7.49 | 7.51 | 7.52 | 7.49 | 7.50 | 7.58 | 7.47 | 7.48 | 7.51 |
| Maximum exothermic temperature (° C.) | 138 | 141 | 135 | 143 | 144 | 135 | 129 | 143 | 148 | 125 | 134 | 144 | 140 | 143 |
| Susceptibility to discoloration (ΔYI value) | 0.2 | 0.6 | 0.2 | 1.1 | 1.3 | 0.5 | 0.3 | 0.5 | 1.5 | 0.2 | 0.4 | 0.9 | 0.5 | 0.7 |
| Heat shrinkage (%) | 4.4 | 4.4 | 4.5 | 8.9 | 4.3 | 4.5 | 4.1 | 4.8 | 4.5 | 4.2 | 3.9 | 4.2 | 4.5 | 4.7 |

TABLE 2

| | Comparative Examples | | | | | |
|---|---|---|---|---|---|---|
| | 1 | 2 | 3 | 4 | 5 | 6 |
| Excenol 941 | 50 | 50 | — | 100 | 50 | 100 |
| G-700 | 20 | 20 | 100 | — | — | — |
| GP3000 | 30 | 30 | — | — | 50 | — |
| Glycerin | 5 | 5 | 5 | 5 | 5 | 5 |
| Gypsum dihydrate | — | 5 | 30 | 30 | 30 | — |
| Water | 8 | 8 | 8 | 8 | 8 | 3.2 |
| Dimethylethanolamine | 0.3 | 0.3 | 0.3 | 0.3 | 0.3 | 0.3 |
| Organometallic compound MRH-110 | 0.3 | 0.3 | 0.3 | 0.3 | 0.3 | 0.3 |
| Foam stabilizer F-650 | 1 | 1 | 1 | 1 | 1 | 1 |
| Flame-retardant CR504 | 10 | 10 | 10 | 10 | 10 | 10 |
| Polyisocyanate T-65 | 83.3 | 93.7 | 115.9 | 87.0 | 88.6 | 50.7 |
| Isocyanate index | 80 | 90 | 90 | 90 | 90 | 110 |
| Density (kg/m$^3$) | 16.3 | 16.1 | Could not | 17.3 | 17.0 | 30.0 |
| Hardness (kPa) | 19.8 | 20.1 | be | 9.3 | 5.3 | 19.5 |
| Moldability | 7.49 | 7.51 | measured | 7.52 | 10.6 | 7.21 |
| Maximum exothermic temperature (° C.) | 198 | 168 | because of the foam's | 133 | 132 | 150 |
| Susceptibility to discoloration (ΔYI value) | 12.1 | 6.8 | shrinkage | 0.2 | 0.1 | 1.8 |
| Heat shrinkage (%) | 4.2 | 4.4 | | 4.3 | 4.2 | 4.2 |

As is shown in Table 1, in Examples 1 to 14, the polymeric polyol and the low molecular weight polyether polyol were used as the polyol and the inorganic compound hydrate was blended in the raw material. As a result, the apparent density of the resultant foam was decreased to 14.1 to 19.8 kg/m$^3$, and the hardness of the same was maintained at 16.9 to 23.5 kPa. For the moldability of the foam, the dimensional accuracy of the foam was as good as 7.47 to 7.58 mm. Furthermore, the maximum exothermic temperature was kept as low as 125 to 148° C. and the ΔYI value was suppressed to 0.2 to 1.5. When tolylene diisocyanate was used as the polyol, the heat shrinkage of the foam was kept as low as about 4 to 5%.

In contrast, in Comparative Example 1, as is shown in Table 2, the maximum exothermic temperature rose to 198° C. and the ΔYI value was 12.1, causing marked yellowing, because gypsum dihydrate, as the inorganic compound hydrate, was not blended in the raw material. In Comparative Example 2, the maximum exothermic temperature rose to 168° C. and the ΔYI value was 6.8, causing marked yellowing, because the blending quantity of gypsum dihydrate was excessively low. In Comparative Example 3, the foam had a closed cell structure, because the polymeric polyol was not blended and the low molecular weight polyether polyol alone was used as the polyol. As a result, gas was trapped in the cells of the foam, the volume of the gas was decreased by cooling, causing the shrinkage of the foam, and the physical properties could not be measured. In Comparative Examples 4 and 5, a sufficient crosslinked structure was not formed in the foam because the low molecular weight polyether polyol was not blended in the raw material, whereby the hardness of the foam was lowered. In Comparative Example 6, the apparent density of the foam was as high as 30.0 kg/m$^3$ because neither the low molecular weight polyether polyol nor gypsum dihydrate was blended and the blending quantity of water, as the blowing agent, was decreased.

EXAMPLES 15-27 AND COMPARATIVE EXAMPLES 7-10

In Examples 15-27 and Comparative Examples 7-10, foams were obtained in the same manner as in Example 1 except that the composition of the raw material was changed as shown in Table 3 and Table 4. In Comparative Examples 7 and 10, the above described low molecular weight polyether polyol was not blended. In Comparative Example 8, the above described polymeric polyol was not blended. In Comparative Example 9, neither the polymeric polyol nor the low molecular weight polyether polyol was blended.

Each of the resultant foams was measured for its apparent density, hardness, moldability, maximum exothermic heat, susceptibility to discoloration (ΔYI value) and heat shrinkage (%) in the same manner as in Example 1. The results are shown in Table 3 and Table 4.

TABLE 4

| | Comparative Examples | | | |
|---|---|---|---|---|
| | 7 | 8 | 9 | 10 |
| Excenol 941 | 100 | — | — | 50 |
| G-700 | — | 100 | — | — |
| GP3000 | — | — | 100 | 50 |
| Glycerin | 5 | 5 | 5 | 5 |
| Gypsum dihydrate | 30 | 30 | 30 | 30 |
| Water | 8 | 10 | 10 | 10 |
| Dimethylethanolamine | 0.3 | 0.3 | 1.0 | 1.0 |
| Organometallic compound MRH-110 | 0.3 | 0.3 | — | — |
| Foam stabilizer F-650 | 1 | 1 | 1 | 1 |
| Flame-retardant CR504 | 10 | 10 | 10 | 10 |
| Polyisocyanate T-65 | 104.5 | 158.5 | 107.7 | 106.1 |
| Isocyanate index | 100 | 100 | 100 | 100 |
| Density (kg/m$^3$) | 16.5 | Could not | 16.4 | 16.8 |
| Hardness (kPa) | 4.0 | be | 5.0 | 4.0 |
| Moldability | 8.10 | measured | 8.90 | 8.50 |
| Maximum exothermic temperature (° C.) | 150 | because of the foam's | 151 | 152 |
| Susceptibility to discoloration (ΔYI value) | 0.4 | shrinkage | 0.6 | 0.4 |
| Heat shrinkage (%) | 4.7 | | 4.8 | 4.6 |

As shown in Table 3, in Examples 15 to 27, the polymeric polyol, the low molecular weight polyether polyol, the inorganic compound hydrate, and tolylene diisocyanate as the polyisocyanate were blended. As a result, in the foams of Examples 15 to 27, the apparent density was as low as 15 to 20 kg/m$^3$ and the hardness was as good as 9 to 25 kPa. Furthermore, the moldability was good and discoloration was suppressed. In all the foams except that of Example 27, the heat shrinkage was kept as low as 4 to 5%.

TABLE 3

| | Examples | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| Excenol 941 | 50 | 30 | — | 30 | 50 | 20 | 50 | 50 | 50 | 50 | 50 | 50 | 50 |
| POP31/28 | — | — | 50 | — | — | — | — | — | — | — | — | — | — |
| G-700 | 20 | 40 | 20 | 20 | — | 50 | 20 | 20 | 20 | 20 | 20 | 20 | 20 |
| G-400 | — | — | — | — | 20 | — | — | — | — | — | — | — | — |
| GP3000 | 30 | 30 | 30 | 50 | 30 | 30 | 30 | 30 | 30 | 30 | 30 | 30 | 30 |
| Glycerin | 5 | 5 | 5 | 5 | 5 | 5 | — | 5 | 5 | 5 | 5 | — | 5 |
| TMP | — | — | — | — | — | — | — | — | — | — | — | 5 | — |
| Gypsum dihydrate | 30 | 30 | 30 | 30 | 30 | 30 | 30 | 30 | | | 10 | 30 | 30 |
| Magnesium sulfate heptahydrate | — | — | — | — | — | — | | — | 30 | — | — | — | — |
| Magnesium phosphate octahydrate | — | — | — | — | — | — | — | | — | 30 | — | — | — |
| Water | 10 | 10 | 10 | 10 | 10 | 10 | 10 | 10 | 10 | 10 | 10 | 10 | 10 |
| Dimethylethanolamine | 0.3 | 0.3 | 0.3 | 0.3 | 0.3 | 0.3 | 0.3 | 0.3 | 0.3 | 0.3 | 0.3 | 0.3 | 1.0 |
| Organometallic compound MRH-110 | 0.3 | 0.3 | 0.3 | 0.3 | 0.3 | 0.3 | 0.3 | 0.3 | 0.3 | 0.3 | 0.3 | 0.3 | — |
| Foam stabilizer F-650 | 1 | 1 | 1 | 1 | 1 | 1 | 1 | 1 | 1 | 1 | 1 | 1 | 1 |
| Flame-retardant CR504 | 10 | 10 | 10 | 10 | 10 | 10 | 10 | 10 | 10 | 10 | 10 | 10 | 10 |
| Polymeric MDI | — | — | — | — | — | — | — | — | — | — | — | — | 195.8 |
| Polyisocyanate T-65 | 111.2 | 117.0 | 110.0 | 111.9 | 106.1 | 119.0 | 100.6 | 96.6 | 111.2 | 111.2 | 111.2 | 106.4 | — |
| Isocyanate index | 100 | 100 | 100 | 100 | 100 | 100 | 100 | 80 | 100 | 100 | 100 | 100 | 100 |
| Density (kg/m$^3$) | 16.4 | 17.0 | 16.5 | 16.8 | 16.2 | 16.3 | 16.5 | 16.4 | 16.8 | 16.4 | 15.9 | 16.1 | 16.4 |
| Hardness (kPa) | 18.0 | 19.0 | 15.0 | 12.0 | 15.0 | 20.0 | 9.0 | 15.0 | 17.0 | 18.0 | 17.0 | 15.0 | 20.0 |
| Moldability | 7.50 | 7.50 | 7.50 | 7.50 | 7.50 | 7.50 | 7.50 | 7.50 | 7.50 | 7.50 | 7.50 | 7.50 | 7.50 |
| Maximum exothermic temperature (° C.) | 155 | 160 | 155 | 153 | 149 | 163 | 148 | 145 | 156 | 154 | 165 | 156 | 157 |
| Susceptibility to discoloration (ΔYI value) | 0.4 | 0.6 | 0.2 | 0.5 | 0.7 | 0.3 | 0.6 | 0.4 | 0.6 | 0.8 | 1.5 | 0.5 | 1.2 |
| Heat shrinkage (%) | 4.4 | 4.5 | 4.8 | 4.4 | 4.4 | 4.6 | 4.7 | 4.4 | 4.6 | 4.8 | 4.5 | 4.1 | 8.5 |

In contrast, in Comparative Examples 7 to 10, at least one of the polymeric polyol and the low molecular weight polyether polyol was not blended as shown in Table 4, whereby the resultant foams lacked rigidity and were poor in hardness.

Therefore, the present examples and embodiments are to be considered as illustrative and not restrictive and the invention is not to be limited to the details given herein, but may be modified within the scope and equivalence of the appended claims.

The invention claimed is:

1. A polyurethane foam obtained by reacting, foaming, and curing a raw material which comprises a polyol, a polyisocyanate, a blowing agent, a catalyst, and an inorganic compound hydrate, wherein the raw material contains, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000, wherein the blending quantity of the inorganic compound hydrate is 10 to 80 parts by mass per 100 parts by mass of the polyol, wherein the polyurethane foam has hot press moldability, and wherein the polyurethane foam has an apparent density of from 14 to 20 kg/m$^3$, and a hardness of from 15 to 25 kPa.

2. The polyurethane foam according to claim 1, wherein the raw material further comprises, as the polyol, a polyether polyol obtained by addition polymerization of an alkylene oxide to a polyhydric alcohol and having a mass average molecular weight of 2,000 to 4,000.

3. The polyurethane foam according to claim 2, wherein the blending quantity of the polyether polyol having a mass average molecular weight of 2,000 to 4,000 is 50% by mass or less in relation to the total amount of the polymeric polyol, the polyether polyol having a mass average molecular weight of 400 to 1,000, and the polyether polyol having a mass average molecular weight of 2,000 to 4,000.

4. The polyurethane foam according to claim 1, wherein the raw material further comprises a crosslinking agent having 3 hydroxyl groups per molecule.

5. The polyurethane foam according to claim 1, wherein the polyisocyanate is tolylene diisocyanate.

6. The polyurethane foam according to claim 1, wherein the inorganic compound hydrate is a hydrate of a sulfate or phosphate.

7. The polyurethane foam according to claim 1, wherein the blowing agent is water, and the blending quantity of water is 5 to 15 parts by mass per 100 parts by mass of polyol.

8. The polyurethane foam according to claim 1, wherein the raw material further comprises a flame retardant.

9. The polyurethane foam according to claim 1, wherein the polyurethane foam is a slab foam obtained by reacting, foaming, and curing the raw material at ordinary temperature (25° C.) and atmospheric pressure (0.1 MPa).

10. The polyurethane foam according to claim 1, wherein the mass average molecular weight of the polymeric polyol is 3,000 to 6,000.

11. The polyurethane foam according to claim 1, wherein the blending quantity of the polymeric polyol is 25 to 60% by mass in relation to the total amount of the polymeric polyol and the polyether polyol having a mass average molecular weight of 400 to 1,000.

12. The polyurethane foam according to claim 1, wherein the isocyanate index of the polyisocyanate is 80 to 100.

13. The polyurethane foam according to claim 1, wherein the specific gravity of the inorganic compound hydrate is 1.5 to 3.0.

14. The polyurethane foam according to claim 1, wherein the raw material further comprises a foam stabilizer, and the blending quantity of the foam stabilizer is 0.5 to 2.5 parts by mass per 100 parts by mass of polyol.

15. The polyurethane foam according to claim 1, wherein the decomposition temperature of the inorganic compound hydrate is 100 to 170° C.

16. A polyurethane foam obtained by reacting, foaming, and curing a raw material which comprises a polyol, a polyisocyanate, a blowing agent, a catalyst, and an inorganic compound hydrate, wherein the raw material contains, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000, wherein the polyisocyanate comprises tolylene diisocyanate, wherein the inorganic compound hydrate is a hydrate of a sulfate or phosphate and wherein the blending quantity of the inorganic compound hydrate is 10 to 80 parts by mass per 100 parts by mass of the polyol, wherein the polyurethane foam has hot press moldability, and wherein the polyurethane foam has an apparent density of from 14 to 20 kg/m$^3$, and a hardness of from 15 to 25 kPa.

17. The polyurethane foam according to claim 16, wherein the blowing agent is water, and the blending quantity of water is 5 to 15 parts by mass per 100 parts by mass of polyol.

18. The polyurethane foam according to claim 16, wherein the raw material further comprises, as the polyol, a polyether polyol obtained by addition polymerization of an alkylene oxide to a polyhydric alcohol and having a mass average molecular weight of 2,000 to 4,000.

19. The polyurethane foam according to claim 18, wherein the blending quantity of the polyether polyol having a mass average molecular weight of 2,000 to 4,000 is 50% by mass or less in relation to the total amount of the polymeric polyol, the polyether polyol having a mass average molecular weight of 400 to 1,000, and the polyether polyol having a mass average molecular weight of 2,000 to 4,000.

20. The polyurethane foam according to claim 16, wherein the raw material further comprises a crosslinking agent having 3 hydroxyl groups per molecule.

21. A method for manufacturing a polyurethane foam comprising:

preparing polyurethane foam raw material that contains a polyol, a polyisocyanate, a blowing agent, a catalyst, and an inorganic compound hydrate; and producing a polyurethane foam by reacting, foaming, and curing the raw material, wherein the raw material contains, as the polyol, a polymeric polyol obtained by graft polymerization of a vinyl monomer onto a polyether polyol and a polyether polyol obtained by addition polymerization of an alkylene oxide to a polyhydric alcohol and having a mass average molecular weight of 400 to 1,000, and wherein the blending quantity of the inorganic compound hydrate is 10 to 80 parts by mass per 100 parts by mass of polyol, wherein a resultant polyurethane foam has an apparent density of from 14 to 20 kg/m$^3$, and a hardness of from 15 to 25 kPa.

* * * * *